Patented June 12, 1951

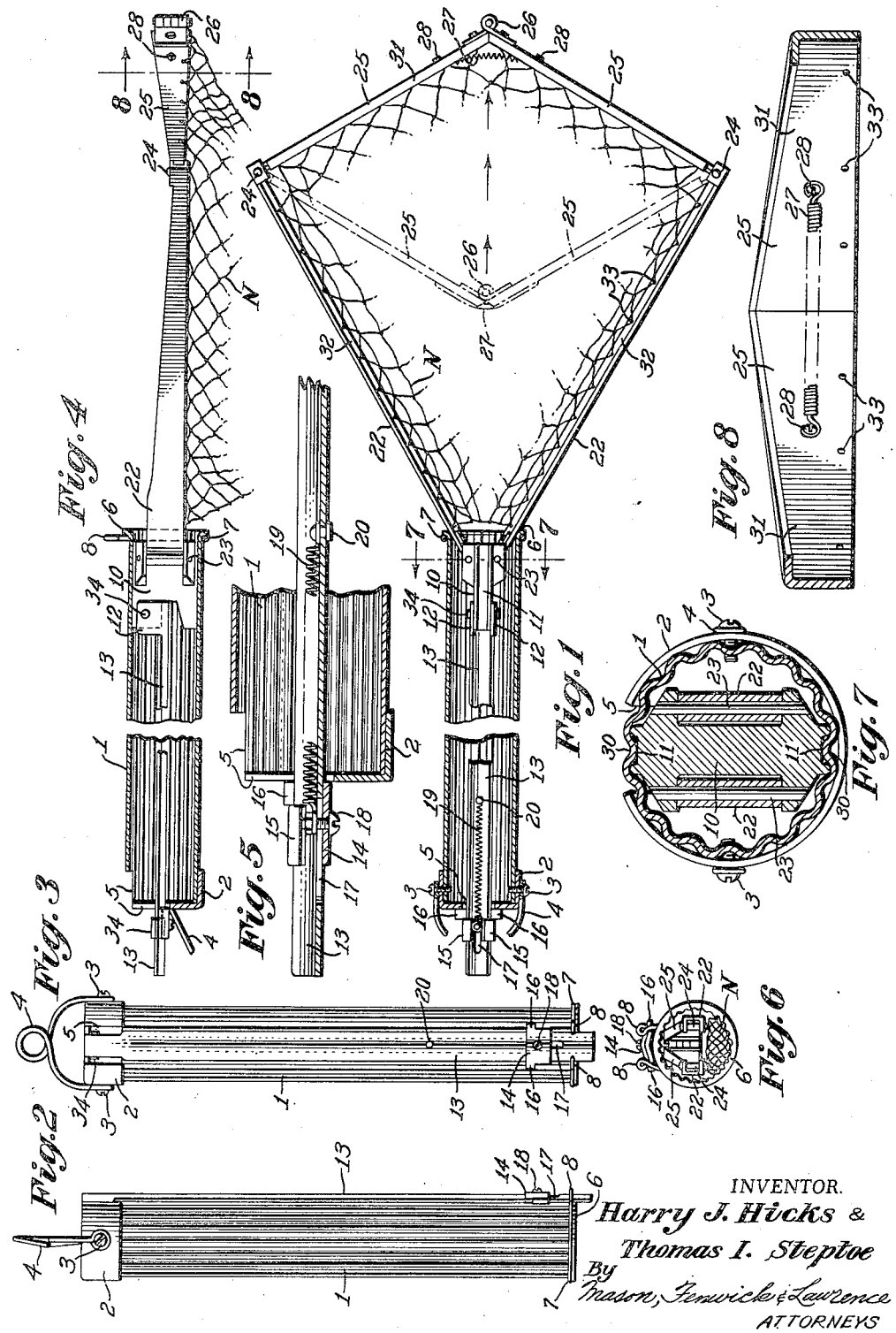

2,556,650

UNITED STATES PATENT OFFICE 2,556,650

COLLAPSIBLE FISH NET

Harry J. Hicks and Thomas Ivan Steptoe,
Lynchburg, Va.

Application October 20, 1949, Serial No. 122,552

3 Claims. (Cl. 43—12)

This invention relates to hand nets for landing fish, and more particularly to a landing net of the collapsible type.

An object of the invention is to provide an improved landing net of the collapsible type in which the net proper and its supporting frame are normally contained in and projected by a compact tubular handle which can be conveniently suspended by a removable connection to the fisherman's belt, thus protecting the net from the weather and from snagging when not in use.

A further object of the invention is to provide a landing net of the type indicated capable of manipulation by one hand from its closed to open position, thus permitting its ready use without seriously impeding the handling of the fishing line.

A further object of the invention is to provide a landing net of the type indicated in which the net frame is of rigid construction, thus assuring security and firmness to the net, not possible where the net frame is formed of pliable members as has commonly been an expedient in devices of this character.

A further object of the invention is to provide an improved connection between the net frame members and the handle, assuring a substantially firm connection between the net frame when in its extended position and the handle.

Further objects will more particularly appear in the course of the following detailed description.

The invention consists in the novel construction, arrangement and combinations of parts hereinafter more particularly described and claimed.

One sheet of drawings accompanies this specification as part thereof, in which like reference characters indicate like parts throughout.

In the drawings:

Figure 1 is a plan view of the improved net showing the handle in longitudinal cross section;

Figure 2 is a side elevation of the net in its folded or compact position;

Figure 3 is a front elevation of the net in its folded or compact position;

Figure 4 is a side elevation partly broken away;

Figure 5 is a fragmentary longitudinal cross section of the rear end of the handle and operative lever when the net is in extended position;

Figure 6 is a front end view of the net in its retracted position;

Figure 7 is a transverse cross section taken on line 7—7 of Figure 1; and

Figure 8 is a transverse cross section taken on line 8—8 of Figure 4.

Folding or collapsible nets have been proposed, but in connection with same it has heretofore been the practice to form the net frame proper of flexible members to permit the collapse of the same within the handle, thus lessening the certainty and precision possible where the net frame is rigid and the association of the net frame with the handle is sufficiently firm to permit the proper wielding of the device.

To avoid and eliminate the difficulties previously encountered in a device of this character it is proposed to provide a tubular handle 1 to one end of which is secured a flange cap 2, as by screws 3, which screws 3 may also conveniently secure to the handle a suspension loop 4 by means of which the device can be attached to the user's belt.

The closure cap 2 is formed with a cut-away notch 5, which notch 5 also extends through the adjacent portion of the tubular handle 1, as is illustrated in Figure 4, to permit the outward rocking of an operating lever 13, as will hereinafter more clearly appear.

As herein illustrated, the tubular handle 1 is of relatively thin, fluted metal and oppositely disposed flutes 30 are utilized as guides for a slide 10 formed on opposite sides with guide grooves 11 within which the said oppositely disposed flutes 30 engage, thereby permitting the free axial movement of the slide 10 but preventing the rotation of the slide with respect to the handle. The rear end of the slide 10 is hinged with respect to wings 12 carried by the operating lever 13 and a pivot pin 34, and in the retracted position of the slide 10 in the handle 1 the operating lever 13 can be swung on the pivot 34 through the notch 5 in the handle and handle cap 2 from a position in axial alignment with the handle to a position superposed against and parallel with the handle, as illustrated in Figure 3.

The opposite end of the handle 1 is preferably flared outwardly as at 6 to present a smooth and rounded mouth for the net and net frame, and behind this flange 6 is preferably positioned a spring ring 7 having its spaced ends provided with loops 8 to constitute a spring catch for the operating lever 13 when in its inoperative position, and folded against the exterior of the handle 1. As illustrated, the operating lever is preferably of a length to extend slightly beyond the end of the handle 1 so that when grasped with one hand this slightly projecting end of the operating lever can be freed from the spring loops 8 by pressure against the leg of the user.

On the rear end of the operating lever 13 is positioned a slide 14 formed with overturned flanges 15 adapted to engage the side edges of the lever 13, and further provided with outwardly directed wings 16—16 adapted to bridge the notch 5 in closure cap 2 and handle 1. A slot 17 is formed lengthwise of the operating handle 13, and through slot 17 a screw 18 passes, securing to the slide 14 the coil spring 19, the opposite end of which is secured to the under face of the operating lever by a rivet 20.

To the forward end of the slide 10 are pivotally connected as by pivots 23 the ends of rigid net frame members 22, the opposite ends of which frame members 22 are pivoted as by pivots 24 to the ends of rigid net frame members 25, which frame members 25 are connected by a hinge joint 26 to constitute a toggle extending between the outer ends of the frame members 22—22.

As herein illustrated, all of the frame members 22 and 25 are formed of L-cross section to provide rigidity in all directions, and the landing net proper N is secured to the flanges 31 of the frame members 25 and the flanges 32 of the frame members 22, which flange members are provided with suitable holes 33 for this purpose.

A coil spring 27 is secured by its ends against the inner face of the frame members 25 and projects across the hinge joint 26 connecting said members, so that the spring 27 exerts a constant, continuous bias tending to force said frame members, constituting the toggle, to their outermost extended position, as illustrated in Figure 1.

With the net extended as illustrated in Figure 1, it being desired to collapse the same, pressure is applied by the hand on the hinge joint 26 to overcome the tension of spring 27 and force the frame members 25 inwardly to the dotted line position shown in that figure. Thereafter, the frame members and the net are forced rearwardly into the handle, forcing slide 10 and operating lever outwardly until the pivot 34 of the operating lever comes below the notch 5 in the handle, after which the operating lever can be folded backwardly against the handle and its free end caught in the spring clip 7.

Conversely, with the net in its compacted position, as illustrated in Figures 2 and 3, to extend the net the handle is removed from the belt and by pressure against the leg the operating lever 13 is freed from the spring clip 7 and extended to a position in axial alignment with the handle. Thereafter, by pressing the end of the operating lever 13 against the leg and pressing backwardly on the handle, the slide 10 with its associated net and net frame members, is forced toward the open end of the handle to the position illustrated in Figures 1 and 4, the spring 27 operating on the toggle frame members 25—25 throughout the opening process and automatically throwing the toggle from the dotted position to the full line position shown in Figure 1.

At the end of the normal outward stroke of the operating lever 13 the flanges 16—16 of slide 14 come into engagement with the handle cap 2 and additional pressure must be applied through the end of the operating lever to force the operating lever and slide 10 still further to the right and against the tension of spring 19 which operates through the flanges 16 and the handle 1 to exert a constant retractile force against slide 10, tending to pull slide 10 inwardly and thus exerting a constant pressure against the ends of the frame members 22—22, thus assuring a firm, tight engagement between the net frame and the handle 1 when the net frame is in its extended position and eliminating any looseness at this joint which would interfere with the proper manipulation of the net.

Thus it is clear that applicants have provided a landing net of the collapsible type utilizing rigid net frame members, but so associating these rigid net frame members as to automatically extend the same into operative position, and also to assure a firm, effective connection between the net frame and the handle when the net frame is extended.

Various modifications will readily suggest themselves to those skilled in the art but within the scope of the present invention as claimed.

Having thus fully described the invention, we claim:

1. A hand net comprising a tubular handle, an articulated net frame including a plurality of rigid frame members, a slide operable in the handle carrying pivots for the ends of two of the frame members, two other frame members hinged at their adjacent ends to each other and at their remote ends to the ends of the first mentioned frame members, spring means biasing the second mentioned frame members to their outwardly extended position, manually operable means for traversing the slide within the handle, and means for tensioning the slide with respect to the handle to exert a constant retractive pressure on same when the frame members are in extended position.

2. A hand net comprising a tubular handle, four rigid net frame members, a slide operable in the handle, an operating lever hingedly associated with the slide arranged to be swung from a position in axial alignment with the handle to a position in surface contact with and exterior of the handle, two of the net frame members pivoted by their ends to the slide member, the other two net frame members pivoted together at their adjacent ends and to the ends of the first mentioned two members to constitute a toggle therebetween, spring means biasing said toggle to its outermost position and spring means carried by the operating lever arranged to bias said lever when in axial alignment with the handle and with the frame fully extended to exert a retractile force on the slide and hold the two first mentioned frame members in forcible engagement with the mouth of the handle.

3. A hand net comprising a tubular handle, a slide operable in the handle, a net frame formed of four rigid frame members, two of said frame members pivoted to the slide and the other two frame members pivoted to each other and to the first mentioned frame members to constitute a toggle, spring means biasing said toggle frame members to their outermost position, an operating lever pivoted at one end to the slide capable of rocking movement from axial alignment with the handle to a position superposed exteriorly on the handle, a slide on the handle having parts arranged to engage the handle, and spring means connecting the last mentioned slide to the handle whereby the operating lever is tensioned against the handle to exert a retractile force on the first mentioned slide when the net frame members are in extended position to steady said net frame members against the handle.

HARRY J. HICKS.
THOMAS IVAN STEPTOE.

REFERENCES CITED

The following references are of record in the file of this patent:

UNITED STATES PATENTS

| Number | Name | Date |
|---|---|---|
| 440,568 | Hebard | Nov. 11, 1890 |
| 1,077,481 | Levy | Nov. 4, 1913 |
| 2,115,082 | Phillips | Apr. 26, 1938 |